UNITED STATES PATENT OFFICE.

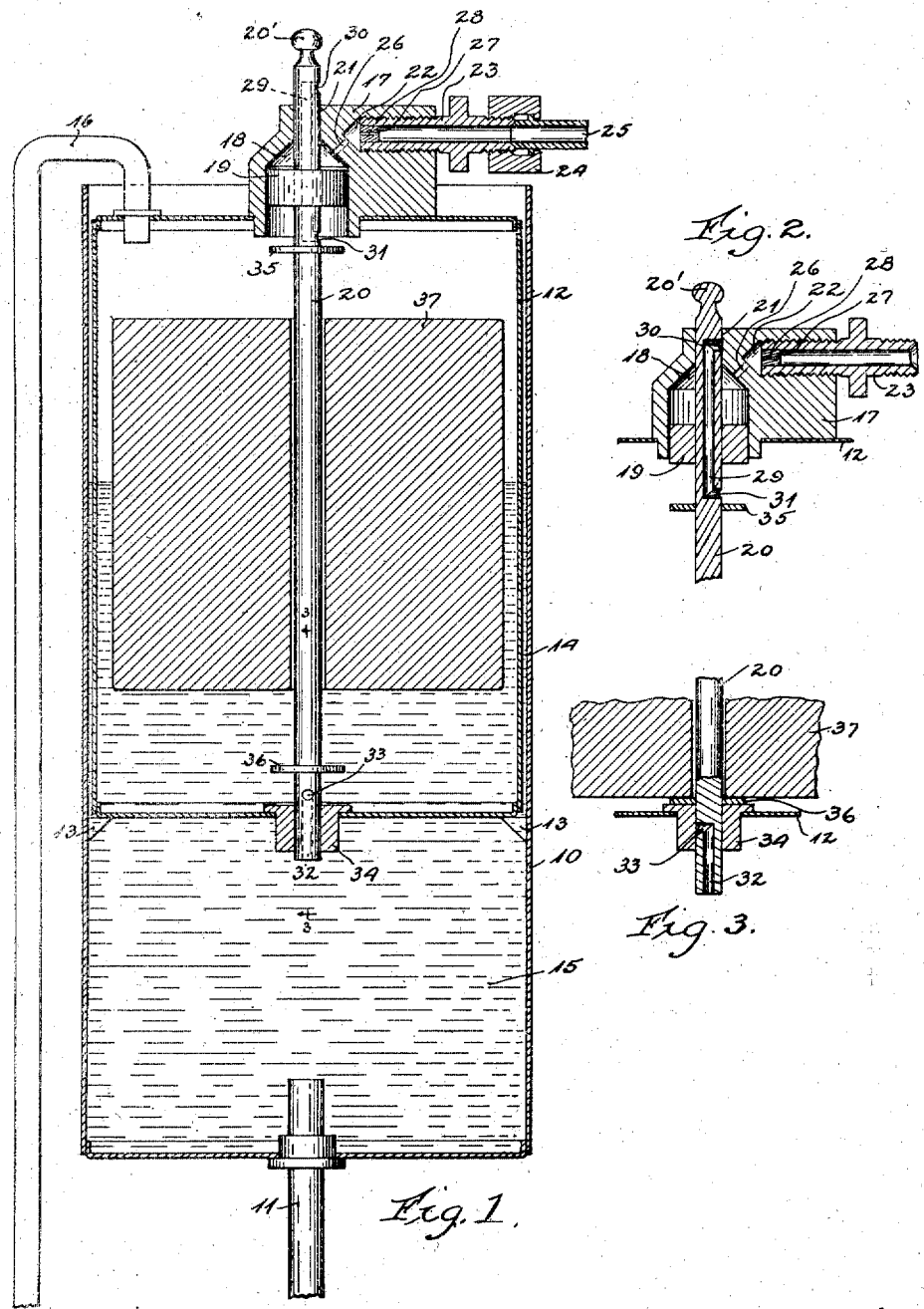

WILFRED SHURTLEFF, OF MOLINE, ILLINOIS.

FUEL-FEEDING MECHANISM.

1,243,990.  Specification of Letters Patent.  Patented Oct. 23, 1917.

Application filed September 3, 1915.  Serial No. 48,769.

*To all whom it may concern:*

Be it known that I, WILFRED SHURTLEFF, a citizen of the United States, and a resident of Moline, in the county of Rock Island and State of Illinois, have invented certain new and useful Improvements in Fuel-Feeding Mechanism, of which the following is a specification.

My invention relates to liquid fuel feeding mechanism adapted particularly for controlling the feed of oil to carbureters of vehicle gas engines.

In some prior art devices of this class an auxiliary oil tank located above the level of the main tank is connected with the carbureter and contains a float vessel connected with the auxiliary tank and with the main tank, the float vessel having also connection with usually the manifold of the engine, and having also an atmosphere inlet. Ordinary valves which move to and from seats are usually provided for controlling the connection between the float vessel and the auxiliary tank, and the connection of the float vessel with atmosphere or the engine manifold. Such ordinary valves are apt to become clogged, and dirt is apt to lodge between the seat and the valve to prevent proper and efficient functioning of the valves. Furthermore, complicated lever mechanism is connected with the float and is employed to operate the valves and the construction of the entire mechanism is more or less complicated and apt to be unreliable and inefficient.

In such earlier devices the valves controlling the connection with atmosphere and manifold are controlled to be alternately operated, that is, when the air inlet valve is open the suction controlling valve is closed and when the air valve is closed the suction controlling valve is open. Furthermore, the valve controlled passageway from the float vessel to the manifold is not restricted and therefore opening and closing of the suction controlling valve has a tendency to interfere with proper operation of the carbureter and the mixture delivered thereby.

Among the important objects of my invention are to provide a continuously open passageway between the manifold and the float chamber and so restricted and limited as to prevent sudden variations in resistance to the suction effect, to thus prevent interference of the feeding mechanism with the adjustment and operation of the carbureter, particularly when the carbureter is throttled to have the engine run slowly; to provide improved valve mechanism controlled conjointly by the float and the suction in the restricted passageway for controlling the connection of the float chamber with atmosphere; to adapt such valve mechanism to be self-cleaning; to provide simple and self-cleaning valve mechanism for connecting the float chamber with the auxiliary tank; and in general to provide a simple, more durable, more reliable and more efficient controlling mechanism of the class referred to.

The various features of my invention are clearly disclosed on the accompanying drawing in which—

Figure 1 is a vertical diametral sectional view of the feed controlling mechanism;

Fig. 2 is a sectional view of the atmosphere controlling valve mechanism showing the valve in another position; and Fig. 3 is a sectional view on plane 3—3, Fig. 1, showing the oil outlet controlling valve in another position.

The auxiliary tank 10 is preferably of sheet metal and of elongated cylindrical form with its upper end open, and provided through its base with the outlet pipe 11 which in practice is connected with the carbureter. Within the auxiliary tank is the cylindrical float vessel 12 closed at top and bottom and supported on brackets 13 extending from the tank 10. The vessel 12 is of slightly less diameter than the tank 10 to leave the annular vent passageway 14 to atmosphere from the space 15 in the tank 10 below the vessel 12. A pipe 16 connects the upper end of vessel 12 with a main oil supply tank which in practice is below the level of the auxiliary tank 10. Mounted on the top wall of the float vessel 12 is a frame 17 in the form of a casting providing the piston chamber 18 for the piston 19 which is mounted on the valve stem 20 extending axially through the chamber and vessel with its upper end projecting through the guide passageway 21 in the frame 17. The frame has the laterally extending threaded passageway 22 for receiving the nipple 23 which is adapted by coupling 24 for connection with pipe 25 which in practice leads to the manifold of the engine. A small passageway 26 connects the inner end of the passageway 22 with the upper part of the piston chamber 18, and in the nipple 23 there is a plug 27 which has a fine reducing passageway 28 therethrough for controlling the flow of air from the float vessel to the manifold. The piston 19 does not fit tightly in its chamber but is of sufficiently reduced diameter to leave a very fine restricted annular passageway between it and the chamber walls for the flow of air.

The upper part of the stem 20 has the longitudinal passageway 29 therethrough connected at its ends with the exterior of the stem by upper and lower lateral ports 30 and 31 respectively, the arrangement being such that when the piston has moved upwardly a distance in chamber 18 the upper port 30 will be in communication with atmosphere, and when the piston is down the port 30 will be inside the opening 21 in the frame 17, so that when the piston is up the float vessel will have connection with atmosphere, and when the piston is down such atmosphere connection will be cut off.

Extending upwardly a distance from the lower end of the valve stem 20 is the longitudinal passageway 32 connected with the lateral port 33, and the base of the vessel 12 carries a block 34 having an opening through which the lower end of the valve stem extends. The arrangement is such that when the piston 19 is up and the float vessel is connected with atmosphere, the port 33 will be above the block 34 to connect the float vessel with the space 15, and when the piston 19 is down the port 33 will be inside the block 34 to disconnect the float vessel from the space 15.

The valve stem carries upper and lower abutment plates 35 and 36 and a float 37 surrounds the stem between these plates but is of less height than the distance between them. The arrangement is such that when there is sufficient oil in the float vessel the float will be raised against the plate 35 to shift the valve stem 20 upwardly to connect passageway 29 with the atmosphere, and when the oil level decreases below a minimum the float will engage the lower abutment plate 36 and will shift the valve stem to its lower position.

The operation of my improved feed mechanism is now apparent. When there is sufficient oil in the vessel the float will be up and the stem will be up sufficiently to expose the air inlet port 30 to the atmosphere, and the suction through the restricted passageway 28 will then draw atmospheric air through the passageway 29 and the suction effect on the oil inlet pipe 16 will be destroyed so that the oil stops flowing. As soon as the level of the oil drops in the vessel 12 and the float sinks into engagement with the collar 36 the stem will be shifted downwardly to close the outlet passageway 32 and to bring the port 30 within the frame 17 so that thereafter the suction will be again effective to draw in oil through the pipe 16 to re-fill the vessel 12. In the position shown in Fig. 1, the valve stem has been moved upwardly to expose the port 30 and to connect the float vessel with atmosphere through passageway 29, the oil flowing from the vessel through passageway 32 to the space 15 from where it can flow to the carbureter. The engine being in operation, the suction in the manifold acts on the carbureter to draw up the combustion mixture for the engine, but owing to the restricted reducing passageway 28 only a small fraction of this suction effect is manifested in the piston chamber 18 and on account of this suction effect air flows through the passageway 29 to the space below the piston and around the piston and to the manifold. The path for air to the manifold is always open but owing to the restricted and reduced passageway 28 the air flow to the manifold is constant and there can be no sudden variations which could interfere with the feeding of a proper mixture from the carbureter to the manifold. This is particularly important during slow running of the engine, for when the carbureter is throttled all the manifold suction tends to exert itself on the auxiliary feed mechanism. Now, if it were possible for the manifold to take in a sudden rush of air when the carbureter is throttled the combustion mixture would suddenly be thinned and the engine would stop. But with the restricted air passageway from the auxiliary feed mechanism to the manifold such sudden inrush of air is prevented and the engine will not stop.

If the level of oil in the float vessel falls sufficiently the float 37 will engage with the abutment plate 36 and will shift the valve stem 20 downwardly to shut off passageway 29 from atmosphere and to close the oil passageway 32 to the space 15. The suction effect from the manifold will now be concentrated on the float vessel and air will be withdrawn therefrom past the piston 19 and to the manifold and oil will flow from the main supply tank through pipe 16 to the float vessel to replenish the supply of oil therein. Here again owing to the restricted passageway 28 there can be no sudden rush of air, the restricted passageway at all times throttling the air down to uniform flow. As soon as the oil again reaches its upper level the float will abut with the top plate 35 and will raise the valve stem 20 to again open passageway 32 and to reconnect the float vessel with atmosphere so that air may enter as the oil level falls. The float 37 will of course follow the oil and will leave the abutment 35, but the suction effect above the piston 19 will be sufficient to hold the valve stem in its raised position. Of course when the engine stops and the suction effect on the piston ceases, the stem may fall, but then when the engine is again started oil will be drawn from the main tank into the float vessel and the float will be raised to restore the stem to its raised position. The upper end of the stem may also be provided with a knob 20' by means of which it can be manipulated manually. The upper end of the stem being visible the driver can know the position of the valve stem and check up on the operation of the device.

It will be noted in the valving arrangement shown that there is no chance for dirt or particles to become lodged between valve surfaces and seats. As the stem 20 slides through its openings in the frame 17 and the block 34, any particles adjacent the inlet ports will be brushed away and therefore clear passageway is always provided. Likewise, there is no chance for accumulation of dirt or particles between the piston 19 and its inclosing walls for such particles will be continuously agitated during shifting of the piston stem and will fall away.

The feed device will of course be subjected to changes in temperature, particularly the oil in the space 15 which is inclosed except for the vent passageway 14. However, such vent passageway will readily take care of expansion and contraction and the oil may rise and fall therein without interfering with the operation of the device. Bubbles resulting from volatilization can readily escape through the vent passageway and the passageway being quite high the bubbles will break before they reach the top thereof and the released gas will escape through the open upper end of the tank 10. As shown, the upper end of the tank extends a distance above the float vessel to form a guard for preventing spill or bubbling over.

I thus provide a feed mechanism which can be operated with the greatest efficiency by continuous but restricted and uniform suction from the manifold without in any wise interfering with the most efficient operation of the manifold to at all times pull the necessary fuel mixture from the carbureter. The construction is of the simplest, involving few, simple and inexpensive parts. There is no chance for clogging or interference by dirt particles and the valve parts and piston can always move freely to accurately perform their functions.

I do not of course desire to be limited to the exact construction, arrangement and operation disclosed as changes and modification may be possible which would still come within the scope of the invention.

I claim as follows:

1. In a fuel feed mechanism of the class described, the combination of a fuel container having a fuel inlet and a fuel outlet, a permanently open air outlet passageway from the container adapted for connection with a suction source, an air inlet to said container, a valve for controlling said air inlet, and a piston connected with said valve and subject to the suction through said outlet passageway to be retained in position to hold said air inlet valve open.

2. In a fuel feed mechanism of the class described, the combination of a fuel container having a fuel inlet and a fuel outlet, a frame at the top of said container having a permanently open air outlet passageway therethrough adapted for connection with a suction source, an air inlet to the container, a valve for controlling said air inlet, said frame having a piston chamber, a piston operable in said chamber and connected with said valve and subjected to the suction in said outlet passageway, a float in said container adapted during change of level in said container to shift said valve to open or close the air inlet, the suction effect on said piston being sufficient to hold the valve in position of opening the air inlet after shifting of the valve to such position by the float.

3. In fuel feeding mechanism of the class described, the combination of a fuel container having a fuel inlet and a fuel outlet, a frame at the upper part of said container having a permanently open air outlet passageway therethrough from the container and adapted for connection with a suction source, an air inlet for the container, a valve for controlling said air inlet, said frame having a piston chamber therein forming the inner end of said air outlet passageway, a piston in said piston chamber connected with said air valve and fitting sufficiently loose in the chamber to leave restricted passageway around its sides, and a float in said container adapted upon variation of fuel level to effect shift of said valve to open or close the air inlet, the suction effect on said piston being sufficient to cause said piston to hold the valve in open position after shift thereof to such position by the float.

4. In a fuel feeding mechanism of the class described, the combination of a container having a fuel inlet and a fuel outlet, a frame at the upper part of said container having a piston chamber therein communicating at its inner end with the container, said frame having a restricted outlet passageway to the exterior from the upper end of said chamber above the piston adapted for connection with a suction source, a piston reciprocable within said chamber and sufficiently loose fitting to leave a restricted passageway around its sides, said restricted piston passageway and said restricted outlet passageway forming a permanently open air outlet from the container, an air inlet to the container, a valve for said air inlet connected with said piston, a float in said container, and upper and lower abutments for said float connected with said valve and adapted to be engaged by said float to shift the valve to open or closed position.

5. In fuel feed mechanism of the class described, the combination of a fuel container having a fuel inlet and a fuel outlet, a frame at the upper part of said container, a permanently open air outlet passageway through said frame from the container adapted for connection with a source of suction, a valve stem extending through said frame into the container, the upper part of said stem having an air passageway provided with inlet and outlet ports, said outlet port being always open to the container, said inlet port being open to atmosphere when the valve stem is out, and being within said frame to be closed when the valve stem is in, abutments on said valve stem, and a float within the container for coöperating with said abutments to shift the valve stem to inner or outer position to thereby effect opening or closure of the inlet air passageway.

6. In fuel feed mechanism of the class described, the combination of a closed fuel container having a fuel inlet and a fuel outlet, a frame at the upper part of said container, a permanently open air outlet passageway through said frame from the container adapted for connection with a source of suction, a valve stem passing through said frame into and through said container, valve mechanisms at the upper and lower ends of said stem for controlling said air inlet and fuel outlet respectively, and a float in the container adapted to coöperate with said stem to control the valving operation thereof.

7. In fuel feed mechanism of the class described, the combination of a closed fuel container having a fuel inlet and a fuel outlet, a permanently open air outlet from said container adapted for connection with a source of suction, an air inlet to the container, a valve stem extending through the container, said stem having valving coöperation at its upper end with the air inlet and having valving coöperation at its lower end with the fuel outlet, and a float in the container adapted to coöperate with said stem to control its valving operation.

8. In fuel feed mechanism of the class described, the combination of a fuel container having a fuel inlet and a fuel outlet, a frame at the upper part of said container, a suction outlet from said container, a stem extending through said container and said frame and having an air inlet passageway at its upper end, the inner end of said passageway being always open to the containe. and the outer end of said passageway being open to the atmosphere when the stem is raised but closed by the frame when the stem is lowered, and a float in said container for controlling the shifting of said stem to open and close said passageway.

In witness whereof I have hereunto set my hand this 30th day of August, A. D., 1915.

WILFRED SHURTLEFF.

Witnesses:
G. A. SHALLBERG,
CLOIRA SUNDBERG,